2,869,257

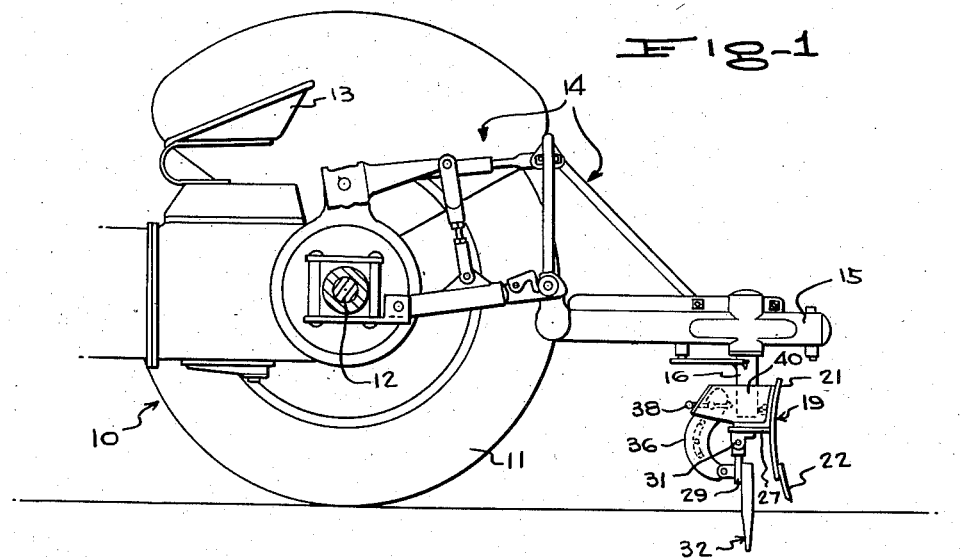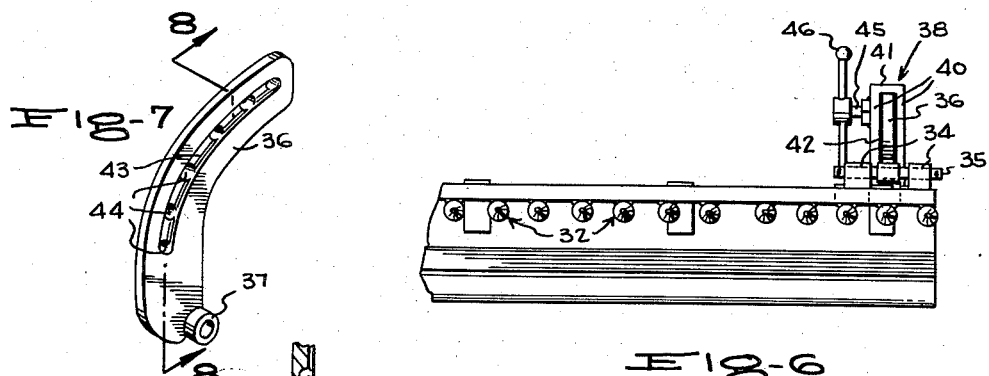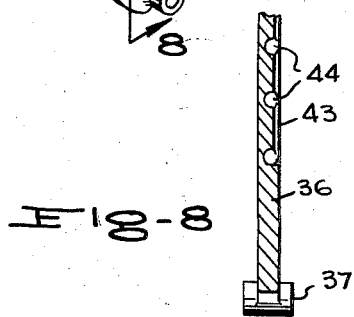

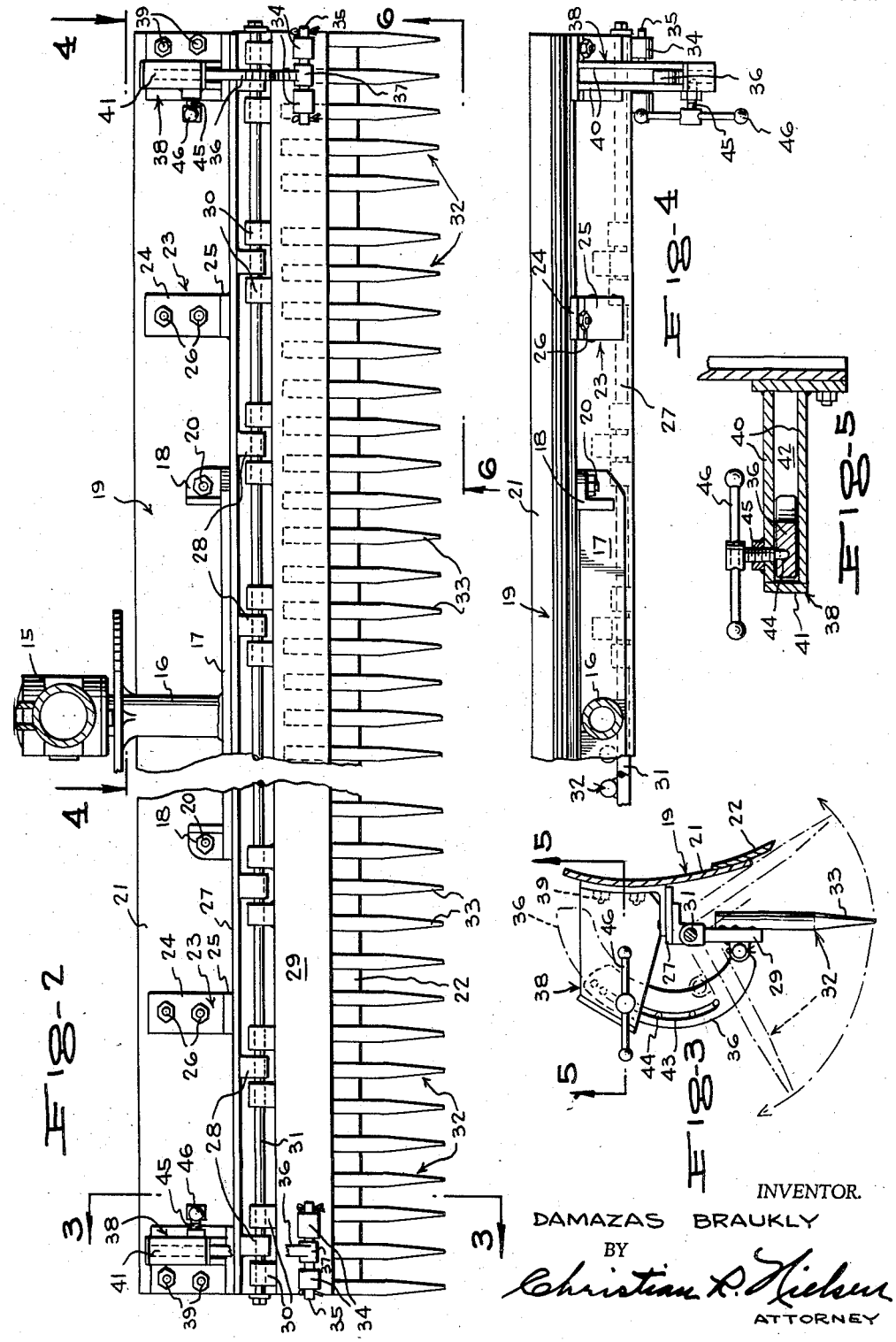

EARTH WORKING MACHINE

Damazas Braukly, Gilbertsville, Pa.

Application February 24, 1958, Serial No. 716,926

3 Claims. (Cl. 37—145)

This invention relates to an earth working machine or apparatus.

The object of the invention is to provide an earth working apparatus which consists of a plurality of teeth that are arranged forwardly of a blade, and wherein there is provided a novel mounting for the teeth and blade so that the apparatus can be operated from and supported at the rear of a conventional tractor, for movement forwardly or backwardly.

Another object of the invention is to provide an earth working apparatus which consists of a plurality of teeth that are arranged forwardly of a blade, the teeth adapted to be moved on a pivot near their bases to different adjusted positions with respect to the blade and in angular relation to the ground so that the device of the present invention can be used for performing various types of operations on ground, soil or the like.

A still further object of the invention is to provide an earth working device which consists of a blade that is supported at the rear of a conventional tractor, and wherein there is provided forwardly of the blade (or rearwardly, depending on the manner of use), a plurality of teeth which can be moved to different angular positions and elevations depending upon the type of work that is to be performed or accomplished.

A further object of the invention is to provide an earth working machine or apparatus which is extremely simple and inexpensive to manufacture.

Other objects and advantages will be apparent during the course of the following description.

In the accompanying drawings, forming a part of this application, and in which like numerals are used to designate like parts throughout the same:

Figure 1 is a fragmentary side elevational view showing the earth working device of the present invention mounted at the rear of a tractor.

Figure 2 is a view taken at right angles to the view shown in Figure 1.

Figure 3 is a sectional view taken on the line 3—3 of Figure 2.

Figure 4 is a sectional view taken on the line 4—4 of Figure 2.

Figure 5 is a sectional view taken on the line 5—5 of Figure 3.

Figure 6 is a sectional view taken on the line 6—6 of Figure 2.

Figure 7 is a perspective view illustrating one of the brackets.

Figure 8 is a sectional view taken on the line 8—8 of Figure 7.

Referring in detail to the drawings, the numeral 10 indicates in Figure 1 a portion of a conventional tractor which includes the usual rear wheels 11, rear axle 12, and seat 13. The numeral 14 indicates a conventional hydraulic lift mechanism which embodies a rearwardly disposed horizontally arranged beam 15. Depending from the beam 15 and connected thereto is a vertically disposed post 16, Figure 2.

The numeral 17 indicates a horizontally disposed brace which is secured as by welding to the lower end of the post 16. Extending upwardly from the brace 17 and secured thereto or formed integral therewith is a pair of spaced parallel ears 18 which are adapted to be secured to a blade 19 by means of suitable securing elements 20. As shown in the drawings, the blade 19 includes a main body portion 21 and a lower ground-engaging portion 22.

There is further provided a plurality of L-shaped lugs 23, and the lugs 23 each include a vertically disposed leg 24 that is secured to the blade 19 by securing elements 26. Each lug 23 further includes a horizontally disposed leg 25, and the numeral 27 indicates a horizontally disposed base which is secured to the legs 25 in any suitable manner, as for example by means of welding.

Depending from the base 27 and secured thereto or formed integral therewith is a plurality of bearing members 28. The numeral 29 indicates a movable bar which has a plurality of bearing pieces 30 extending upwardly therefrom, and a rod 31 extends through the bearing pieces 30 and bearing members 28 whereby a pivotal support is provided for the bar 29.

The numeral 32 designates each of a plurality of teeth or prongs which are secured to the bar 29 in any suitable manner, as for example by welding. The teeth 32 each include a lower pointed end portion 33 which is adapted to engage the ground or earth being worked.

Arranged adjacent each end of the bar 29 and secured thereto is a pair of bearings 34, and extending through each pair of bearings 34 is a pin 35. The numeral 36 designates each of a pair of curved brackets which have a collar 37 on the lower end, and the pin 35 extends through the collar 37. The numeral 38 indicates each of a pair of hollow housings which are secured in place as at 39. As shown in Figure 5 each housing 38 includes spaced parallel wall sections 40 and a wall portion 41, and these wall portions 40 and 41 define therein a space 42 through which the bracket 36 is free to move or travel. As shown in Figure 7 each bracket 36 is provided with an elongated groove or channel 43 which has a plurality of indentations or recesses 44 communicating therewith. The numeral 45 indicates an adjustable screw member which extends through one of the walls 40 of the housing 38, and a handle or crank 46 is connected to each screw member 45.

From the foregoing, it is apparent that there has been provided an earth working machine wherein it will be seen that the blade 19 is arranged rearwardly of the teeth 32. The teeth 32 and blade 19 are mounted below the beam 15, so that by actuating the hydraulic mechanism 14, the blade 19 and teeth 32 can be lifted or lowered as desired. Furthermore, there is provided a means for adjusting the position of the teeth 32 relative to the blade 19, so that for example the teeth 32 can be moved from the solid line position shown in Figure 3 to either of the broken line positions shown in Figure 3. In order to shift the teeth 32 to a desired position, it is only necessary to properly rotate the handles 46 and this will turn the screw members 45 so that the inner ends of the screw members 45 will clear the grooves 43 and recesses 44. This will permit the brackets 36 to pivot or move in the housings 38 and when the teeth 32 have been shifted to their desired or proper position, the handle 46 can again be rotated to bring or move the inner end of the screw member 45 into engagement with a recess 44 so that the teeth 32 will be locked or maintained immoble in their proper adjusted positions.

It is to be noted that the post 16 which extends downwardly from the beam 15 has the brace 17 secured thereto, and the brace 17 is secured to the blade 19 and to the base 27. Thus, the base 27 is fixed with respect to the blade 19, but due to the provision of the rod 31, the bar 29 which carries the teeth 32 is free to rock or pivot about a horizontal axis which extends through the rod 31 and this arrangement permits the teeth 32 to be shifted to the desired position with respect to the blade 19.

This shifting feature of the teeth 32 with respect to the blade 19 is important since it permits the machine of the present invention to perform various types of ground working jobs and by being able to shift the position of the teeth 32, the effect of the teeth on the soil or ground can be changed or regulated as desired.

When the screw members 45 move outwardly sufficiently to permit the brackets 36 to move in the housings 38, it will be seen that the teeth 32 can be readily manually raised or lowered or adjusted as desired then the handle 46 can be used as a means for retaining the teeth in their proper adjusted positions. It is to be noted that the teeth 32 are arranged forwardly of the blade 19, and the teeth 32 and the blade 19 are positioned rearwardly of the tractor 10.

The parts can be made of any suitable material and in different shapes or sizes. As shown in Figure 3 the rake which includes the teeth 32, may be adjusted for performing various grading work. The apparatus of the present invention is especially suitable for use in landscaping, breaking of clogs of soil, raking of stones and debris and leveling soil in one operation. The teeth 32 may be referred to as "sacrificers," and these teeth may be welded to the bar 29.

Thus, it will be seen that there has been provided a rake which passes through top soil like a comb so as to clean out stones, roots and other debris and the position of the rake or teeth 32 relative to the reversible blade 19 is an important feature of the present invention. The angle of the scarifiers is adjustable for different types of raking operations and the present invention can be used for providing a smooth surface so that stones and debris or the like will be removed whereby the ground will be made ready for seed or planting. The blade 19 will level off the ground after the teeth 32 scar the ground. Thus, the ground can either be leveled or scarified or both operations can be performed at the same time, as for example prior to seeding the ground. It is to be noted that the parts are arranged rearwardly of the tractor so that the teeth and blade are dragged or pulled rather than being pushed.

The teeth can be set at a desired angle, and where large clods are encountered, the angle can be decreased and the scarifiers can be adjusted to a more perpendicular position which does a fine job of breaking up the clods. Furthermore, when reseeeding has to be done, a very thorough and quick job of breaking the very surface of the ground can be accomplished by adjusting the scarifiers to the last position toward the bottom of the blade and adjusting the lift and proceeding to score the ground and this task is made more easy and efficient with the present invention. The scarifiers can be raised out of the way when the parts are in transporting position. In another position, the teeth can be arranged so that they will rake stones, roots and other debris out of the top soil and then the device will be followed by the blade which smooths the ground in preparation for seeding and also the high spots will be removed and the low spots will be filled in to make a perfectly level job.

The device is also effective for breaking up clods especially when dry, and the device will level at the same time. The blade is dragged and not pushed by the tractor to level loads of top soil and with the scarifiers in proper position, the leveling and breaking of clods is done in one operation.

In the event a job is finished except for the seeding and suddenly it begins to rain and halts completion, one has to wait for the ground to dry sufficiently before resuming work. In the process the soil has become packed so by having the teeth in the proper position, loosening can be accomplished without dislodging stones under the surface. Also, it can be used for general purpose raking. For breaking clods in damp ground, the device is also suitable since the damp ground does not have a tendency to build up on the rake and the device is also advantageous for leveling and cleaning ground over tree roots and large stones or ground that has been or has to be leveled but a few inches above said obstructions.

In certain positions, the apparatus can be used for bulldozing and the scarifiers aid in pushing top soil and in another position the device is invaluable when reseeding has to be done and ground loosening is important.

Minor changes in shape, size and rearrangement of details coming within the field of invention claimed may be resorted to in actual practice, if desired.

I claim:

1. In an earth working machine, a tractor, a horizontally disposed beam positioned rearwardly of the tractor and adjustably connected thereto, a vertically disposed post depending from said beam, a horizontally disposed brace secured to the lower end of said post, ears extending upwardly from said brace, a curved blade secured to said ears, said blade including a main body portion and a lower ground-engaging portion, a plurality of L-shaped lugs secured to said blade, a horizontally disposed base secured to said lugs, bearing members depending from said base, a movable bar having a plurality of bearing pieces on its upper end, a rod extending through said bearing pieces and bearing members, a plurality of spaced parallel teeth having their upper ends secured to said bar, a pair of spaced apart bearings secured to each end of said bar, a pin extending through each pair of last named bearings, a movable bracket connected to each pin, a pair of spaced apart housings secured at the ends of the blade and base, a screw member connected to each housing for engagement with the bracket, and a manually operable handle connected to each screw member.

2. The structure as defined in claim 1 wherein the lower ends of the teeth are pointed, and wherein the teeth are arranged forwardly of the blade.

3. In an earth working machine, a tractor, a horizontally disposed beam positioned rearwardly of the tractor and adjustably connected thereto, a vertically disposed post depending from said beam, a horizontally disposed brace secured to the lower end of said post, ears extending upwardly from said brace, a curved blade secured to said ears, said blade including a main body portion and a lower ground-engaging portion, a plurality of L-shaped lugs secured to said blade, a horizontally disposed base secured to said lugs, bearing members depending from said base, a movable bar having a plurality of bearing pieces on its upper end, a rod extending through said bearing pieces and bearing members, a plurality of spaced parallel teeth having their upper ends secured to said bar, a pair of spaced apart bearings secured to each end of said bar, a pin extending through each pair of last named bearings, a movable bracket connected to each pin, a pair of spaced apart housings secured at the ends of the blade and base, a screw member connected to each housing for engagement with the bracket, a manually operable handle connected to each screw member, the lower ends of said teeth being pointed, and said teeth being arranged forwardly of the blade, there being an arcuate groove in each bracket, there being a plurality of spaced apart recesses communicating with each groove for engagement by the screw members.

References Cited in the file of this patent

UNITED STATES PATENTS

| 1,936,209 | Reiland | Nov. 21, 1933 |

FOREIGN PATENTS

| 29,891/30 | Australia | Oct. 30, 1930 |
| 1,092,775 | France | Nov. 10, 1954 |
| 124,968 | Sweden | May 17, 1949 |